May 22, 1945. J. J. KENNEDY Re. 22,643
ELECTRICAL SYSTEM
Original Filed Dec. 6, 1940
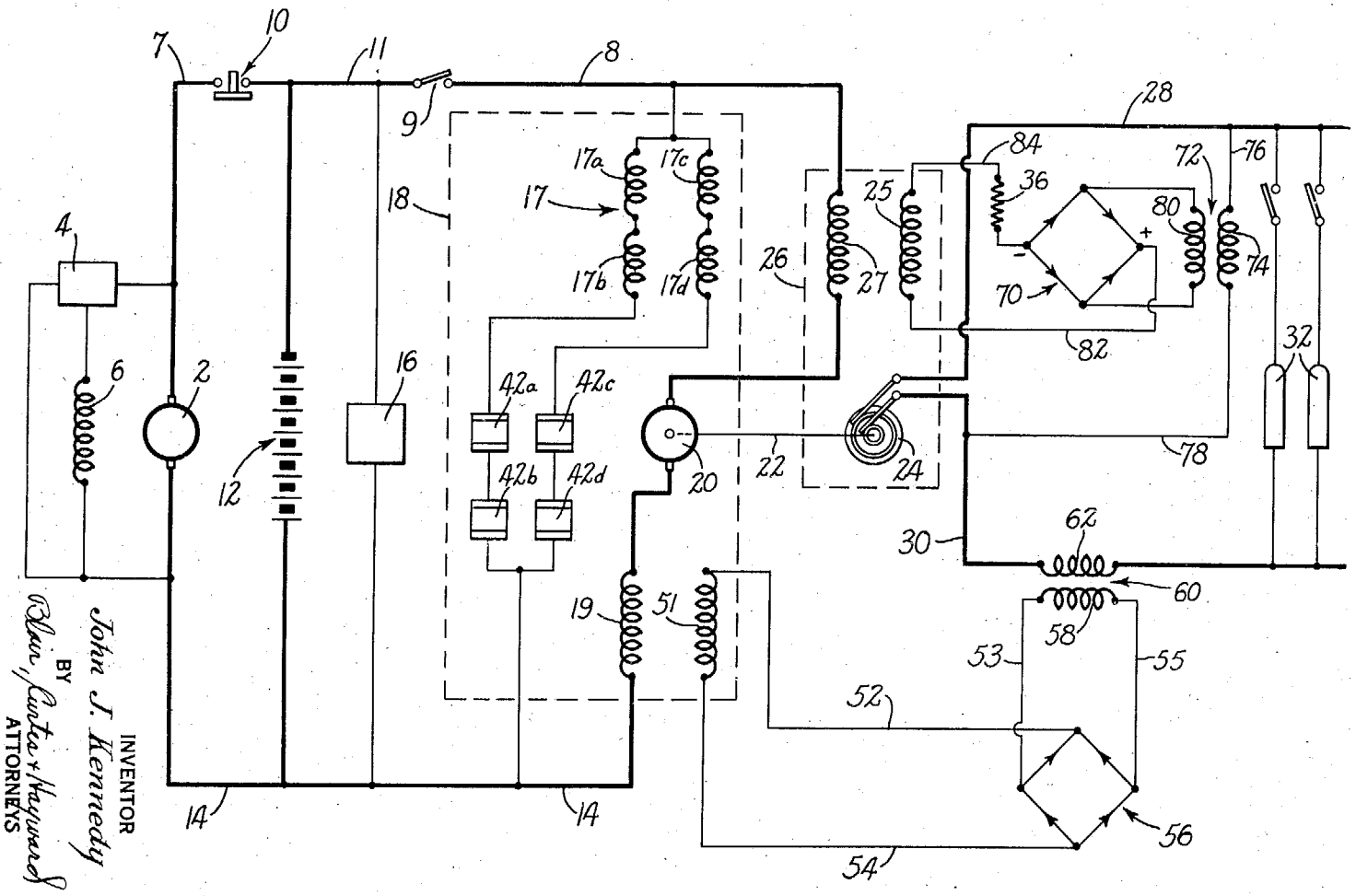
INVENTOR
John J. Kennedy
BY
Blair, Curtis & Hayward
ATTORNEYS Reissued May 22, 1945

Re. 22,643

UNITED STATES PATENT OFFICE 22,643

ELECTRICAL SYSTEM

John J. Kennedy, New Haven, Conn., assignor to The Safety Car Heating and Lighting Company, Inc., a corporation of Delaware Original No. 2,311,340, dated February 16, 1943, Serial No. 368,801, December 6, 1940. Application for reissue January 18, 1945, Serial No. 573,392

7 Claims. (Cl. 171—123)

This invention relates to the translation of power from one form to another and more particularly to a system for supplying current to fluorescent lights on railway cars where direct current is translated into alternating current of constant voltage.

An object of this invention is to provide a reliable and dependable source of alternating current of constant frequency and voltage. A further object is to provide a motor alternator set which will start quickly and build up the output voltage rapidly and which will maintain substantially constant voltage even though there are wide variations in the conditions of use. A further object is to provide a control system for a motor alternator set which will automatically regulate the set to compensate for changes in the power supply as well as changes in the load. A still further object is to provide a source of supply for alternating current power which consumes power only when in use, but which may be conditioned for use in a minimum period of time.

Another object is to provide apparatus of the above character which is inexpensive to manufacture and efficient in operation and which is simple and sturdy in construction. A further object is to provide apparatus of the above character which is light in weight and dependable in operation, and which is readily adaptable for use under a wide variety of conditions. A further object is to provide a method of operating and controlling apparatus of the above character. Other objects will be in part obvious and in part pointed out hereinafter.

The invention accordingly consists in the features of construction, combinations of elements, arrangements of parts, and in the several steps and relation and order of each of the same to one or more of the others, all as will be illustratively described herein, and the scope of the application of which will be indicated in the following claims.

The single figure of the drawing is a circuit diagram of one embodiment of the invention with certain details omitted for clarity.

The present application relates to my copending application, Serial No. 340,031, filed June 12, 1940, entitled "Electric system" and also relates to the copending application of Louis H. Von Ohlsen and myself, Serial No. 345,118, filed July 12, 1940, entitled "Electric system." Material is shown and claimed herein which is not covered in those applications.

In the illustrative embodiment of the present invention, the electrical system of a railway car is diagrammatically shown with certain details omitted for purposes of simplicity. On railway cars, such as coaches, Pullman cars and the like, each car is provided with its own electrical system, and this system generally includes a set of storage batteries, lighting and other equipment, and an axle-driven generator to supply power for the equipment and for charging the batteries. Additional equipment is provided under some circumstances for supplying power to the system when the car is stationary, and in some systems means is provided for driving air-conditioning equipment directly from the car axle when the car is traveling at the proper speed. Equipment for railway cars should be efficient and dependable as well as light in weight and sturdy in construction. Furthermore, it is difficult to insure that the equipment will receive proper attention during use, and it is therefore desirable that the equipment operate with a minimum of adjustment and repair.

With the development of fluorescent lights, it has been found desirable to provide for their use upon railway cars by furnishing a reliable and efficient source of alternating current on each car. If an axle-driven alternator were provided, it would not operate while the car was stationary or running at a slow speed, and when operating, the frequency of the output voltage would vary over too wide a range to be practical. Other systems have been investigated, and it has been found that highly satisfactory results are obtained by providing an alternator driven by a direct current motor which derives its power from the battery-generator system of the car As outlined herein and in the copending applications referred to above, in providing this type of system a number of problems were encountered, and an object of the present invention is to overcome certain of these problems. Among the problems involved is that there is a wide variation in the voltage of the battery-generator system, as this voltage varies depending upon the condition of charge of the battery and upon whether or not power is being supplied by the generator. During normal operation of the usual type of car system the voltage may vary between 28 and 45 volts.

In the copending applications referred to above, systems are provided for maintaining substantially constant frequency and voltage of the output with wide variations in the voltage of the source and the load. Under some circumstances, it is desirable that the output voltage build up at a rapid rate when the set is started, and then that the output voltage be maintained within a very narrow range even though the operating conditions tend to cause a variation. In the illustrative embodiment of the present invention these results are obtained by a motor alternator set. An alternator is driven by a direct current motor which starts rapidly because of the use of a starting winding, and the heavy starting current is effective to cause the alternator voltage to build up at a rapid rate. When the set comes up to speed, the starting winding on the motor is relatively ineffective and the motor tends to maintain its speed substantially constant, even though there are variations in the load and in the voltage source. Furthermore, when the alternator voltage reaches the desired value, it is automatically maintained within permissible limits with the motor armature current increasing the magnetic field of the alternator with increases in load to thereby compensate for armature reaction, etc.

Referring particularly to the left-hand side of the figure of the drawing, a generator 2 is provided with a controller 4 which maintains the proper current in the generator field 6. One side of the generator is connected through a line 7 and an automatically operating switch 10 to a line 11 and a set of batteries 12; this line 11 is connected through a manual switch 9 to a line 8. The other side of the generator is connected through a line 14 to the other side of the batteries. Lines 11 and 14 are the main power lines of the battery-generator system which carries a load 16 consuming direct current. When switch 9 is closed, the voltage across lines 8 and 14 is the same as that of lines 11 and 14, and this voltage varies depending upon the state of charge of the set of batteries and the starting and stopping of the charging action of the generator. Connected across lines 8 and 14, and thus adapted to be energized by the voltage of the battery-generator system, is a direct current motor 18 having a main shunt field winding 17, a starting winding 19 for producing high starting torque and an armature 20. The main shunt field winding 17 is in the form of four separate winding units, designated 17*a*, 17*b*, 17*c* and 17*d*, and these units cooperate in producing the main magnetic field for the motor. Armature 20 is connected through a shaft 22 to drive the armature 24 of an alternator indicated at 26 and having a main field winding 25 and an auxiliary field winding 27. The alternator output brushes are connected to a pair of alternating current lines 28 and 30 which supply alternating current to a load 32 which, in this embodiment, is a bank of fluorescent lights and their attendant auxiliaries.

Motor 18 tends to operate at constant speed throughout a wide range of variation in the supply voltage and, illustratively, this motor is of the type shown in United States Letters Patent 2,134,900, Louis H. Von Ohlsen. Accordingly, the main field winding 17 is connected in series with two pairs of resistance units designated 42*a*, 42*b*, 42*c* and 42*d*, which are Thyrite resistors, or any other material having similar voltage and current characteristics. Winding units 17*a* and 17*b* are connected in series with resistance units 42*a* and 42*b*, and winding units 17*c* and 17*d* are connected in series with resistance units 42*c* and 42*d*; in this manner two series circuits are formed which are connected in parallel across lines 8 and 14.

The magnetic section of the motor 18 is liberal in design and operates below the saturation point on the magnetization curve of the iron. Thus, an increase in field current is accompanied by a substantially proportionate increase in magnetic flux. The Thyrite resistance units have the characteristic that their conductivities vary with the potential impressed upon them, and when there is a variation in the voltage impressed upon the circuit of the main field windings, the field current varies at a rate more rapid than does the impressed voltage. Due to the unsaturated condition of the iron, this current variation is accompanied by a substantially proportionate variation in the field flux with the result that a small variation in voltage causes a relatively great variation in the field flux. Illustratively, if the voltage across lines 8 and 14 increases, there is a substantially greater increase in the field current, and in the magnetic flux, and this increase in magnetic flux is sufficient to hold the motor speed constant.

As explained in detail in the above-mentioned patent, Thyrite resistance units have a negative resistance-temperature coefficient, and units 42*a*, 42*b*, 42*c* and 42*d* are so designed and positioned that the changes in resistance due to temperature changes compensate for changes in resistance in the field winding 17. As pointed out above, the main field winding 17 is divided into four separate winding units which are evenly spaced about the motor casing, and the Thyrite units 42*a*, 42*b*, 42*c* and 42*d* are also evenly spaced as they are mounted on the four arms of the motor frame. Thus, in the resistor units, heat is produced and is readily dissipated the same as in the field windings, and the proper field current flows at all times.

When it is desirable to provide alternating current, switch 9 is closed, and it is important that upon the closing of switch 9, power will be available without undue delay. Motor 18 is therefore provided with a starting winding 19, which is so designed as to make the motor start rapidly. Furthermore, as the motor starts, the alternator voltage builds up rapidly due to the fact that the auxiliary field winding 27 of the alternator 26 carries the full current of the motor armature. That is, the starting current is substantially higher than the normal operating current with the result that the auxiliary field winding 27 of the alternator provides a very strong field for the alternator during the starting period. The starting winding 19 of the motor produces magnetic flux in the same direction as the magnetic flux of the main field winding 17 with the starting winding producing the main portion of the field flux during the starting period, and with the main field winding producing the effective portion of the field flux when the motor is operating at full speed.

When the motor is running at full speed, a change in load causes a change in the armature current which flows through winding 19, and due to the unsaturated condition of the iron parts of the motor these variations in current tend to cause variations in the field flux. This is undesirable particularly because of the fact that variations in field flux have an inverse effect upon motor speed. That is, an increase in load tends to cause an increase in this field flux, which in turn tends to cause a decrease in motor speed, and conversely, a decrease in load tends to cause an increase in speed. In addition to the effect of winding 19, an increase in the mechanical load upon the motor tends to slow the motor down due to factors such as armature and other losses.

To compensate for these effects motor 18 is provided with a compensating field winding 51 which opposes the main motor field winding 17, and the starting winding 19. Winding 51 derives its power from the alternator output and is connected through leads 52 and 54 to a rectifier unit 56. Rectifier unit 56 has its input leads 53 and 55 connected to the output terminals of the secondary winding 58 of a current transformer 60. The primary winding 62 of current transformer 60 is connected in line 30 of the alternator load circuit. During the starting period of the motor alternator, and until there is a load on the alternator, there is no current flowing through line 30, and therefore no current is supplied to winding 51, with the result that starting winding 19 and the main field winding 17 produce the entire field flux. When there is a load on alternator 26, a proportionate current is delivered through transformer 60 and rectifier unit 56 to winding 51 and this current tends to oppose the effect of field windings 19 and 17. The effect of this current in winding 51 is sufficient to neutralize winding 19, and other factors, such as armature resistance, etc., which tend to reduce the motor speed. Thus, the compensating field winding reduces the total field flux produced by all of the motor field windings to maintain constant motor speed.

In the present embodiment the main alternator field winding 25 is supplied with current which is derived from the output circuit of the alternator. Accordingly, the transformer 72 has one side of its primary 74 connected through a lead 76 to line 28 and the other side of the primary is connected through a line 78 to line 30. The secondary winding 80 is connected across input terminals of a rectifier unit 70. Field winding 25 is connected through leads 82 and 84 to the output terminals of the rectifier units with the resistance unit 36 connected in lead 84 in series with the field winding. Resistance unit 36 has a zero temperature-resistance coefficient so that it reduces the effect which changes in temperature of the field winding have upon the total resistance of the circuit. The iron core of alternator 26 is not saturated magnetically, and during operation field windings 27 and 25 cooperate to produce magnetic flux sufficient to maintain constant voltage. These two field windings are in the form of separate sets of windings which are mounted together.

During the starting period the heavy starting current of the motor flowing through field winding 27 sets up a strong magnetic field which is effective to make the alternator voltage build up rapidly. After the set begins to attain speed, the armature current of the motor drops off rapidly, but at this time the alternator voltage is of sufficient value to cause winding 25 to produce a strong magnetic flux. Thus, the voltage is quickly stabilized and thereafter the constant voltage of the alternator causes the field winding 25 to produce a constant flux. When a load is placed on the set, there is an increase in the armature current of the motor, and the various parts are so proportioned and adjusted that the output voltage of the alternator is increased sufficiently to overcome the voltage drop across lines 28 and 30 caused by the increase in load, this drop being due to armature reaction, etc.

Under most conditions of use the output voltage of the motor generator set may properly vary between certain fairly definite limits, and the set is so designed and so regulated that it will maintain the voltage between these limits. Illustratively, a motor alternator set which was built in accordance with the present disclosure produced a minimum voltage of 119 volts and a maximum voltage of 128 volts when the set was operated throughout the range of extreme conditions. These extreme conditions included a change in load from no load to 1250 watts with the direct current source at the extreme voltages of 28 volts and 45 volts, and with the temperature of the set varied from minimum to maximum running temperatures. With this narrow range of variation under these extreme conditions, it is readily seen that during normal operation the variation is much less.

As many possible embodiments may be made of the mechanical features of the above invention and as the art herein described might be varied in various parts, all without departing from the scope of the invention, it is to be understood that all matter hereinabove set forth, or shown in the accompanying drawing is to be interpreted as illustrative and not in a limiting sense.

I claim:

1. In a railway car electrical system for supplying alternating current of substantially constant frequency and voltage wherein power is available from a battery-generator system, the combination of: a direct current motor having an armature and a set of field windings including a main motor winding and a starting winding; means connecting said starting winding in series with said armature; means connecting said main motor winding to receive current from the battery-generator system with control means to regulate the current to maintain substantially constant motor speed throughout a permissible variation in the supply voltage; an alternator having an armature, a main alternator field winding and an auxiliary alternator field winding; a rectifier unit; means connecting said auxiliary alternator field winding in series with the armature of said motor to thereby provide a heavy magnetic field for the alternator during the starting period; means connecting said main alternator field winding to the output terminals of said rectifier unit and connecting the input terminals of said rectifier unit to receive power from the output of said alternator so that said main alternator field winding produced magnetic flux which varies with the output voltage of the alternator.

2. In a railway car electrical system for supplying alternating current of substantially constant frequency and voltage wherein power is available from a battery-generator system, the combination of: a direct current motor comprising, a main motor field winding, a starting winding, an auxiliary motor field winding, and a motor armature; an alternator comprising a main alternator field winding, an auxiliary alternator field winding, and an alternator armature mechanically connected to said motor armature; means electrically connecting said starting winding and said auxiliary alternator field winding in series with said motor armature; means including a resistance assembly electrically connected in series with said main motor field winding across said battery-generator system, said resistance assembly having the characteristic that its resistance varies with the voltage impressed across it so that the motor speed tends to remain constant wtih changes in the supply voltage; and rectifier means to supply current to said auxiliary windings and deriving current from the output circuit of said alternator, said auxiliary motor winding receiving current so that it tends to set up a magnetic flux opposing the main field flux of the motor with the value of current varying with the load on said alternator, and said auxiliary alternator winding receiving current so that it assists said main alternator field winding in producing the magnetic field for the alternator.

3. In an electrical system for supplying power to a load the characteristics of which may vary wherein power is derived from a variable source, the combination of, a constant speed motor having field windings and means to maintain substantially constant speed with variations in the voltage of the variable source, a generator mechanically connected to be driven by said motor and having its output leads connected to supply power to the load, said generator having a main field winding connected to receive substantially constant current from said output leads and an auxiliary winding connected to carry current which varies with the load, and a compensating winding for said motor connected to carry current which varies with the load to thereby compensate the speed of the motor for load variations.

4. In a railway car electrical system for supplying alternating current power of substantially constant frequency and voltage to a load the characteristics of which may vary wherein power is derived from a variable source, the combination of, a constant speed motor having field windings and means to maintain substantially constant speed with variations in the voltage of the variable source, an alternator mechanically connected to be driven by said motor and having its output leads connected to supply alternating current power to the load, said alternator having a main field winding connected to receive substantially constant current from said output leads and having an auxiliary winding connected to carry current which varies with the load, and a compensating winding for said motor connected to carry current which varies with the load thereby to compensate the speed of the motor for load variations.

5. In a railway car electrical system for supplying alternating current power of substantially constant frequency and voltage to a load the characteristics of which may vary wherein power is derived from a battery-generator system the voltage of which varies, the combination of, a constant speed motor having field windings and means to maintain substantially constant speed with variations in the voltage of the battery-generator system, an alternator mechanically connected to be driven by said motor and having its output leads connected to supply alternating current power to the load, said alternator having a rectifier means and a main field winding connected through the rectifier means to receive substantially constant current from said output leads and having an auxiliary winding connected to carry current which varies with the load, and a compensating winding for said motor connected to carry current which varies with the load thereby to compensate the speed of the motor for load variations.

6. In a railway car electrical system for supplying alternating current power of substantially constant frequency and voltage to a load the characteristics of which may vary wherein power is derived from a variable source, the combination of, a constant speed motor having field windings including a winding in series with the motor armature and means to maintain substantially constant speed with variations in the voltage of the variable source, an alternator mechanically connected to be driven by said motor and having its output leads connected to supply alternating current power to the load, said alternator having a main field winding connected to receive substantially constant current from said output leads and having an auxiliary winding connected to carry current which varies with the load, and a compensating winding for said motor connected to carry current which varies with the load thereby to compensate the speed of the motor for load variations.

7. In a railway car electrical system for supplying alternating current power of substantially constant frequency and voltage to a load the characteristics of which may vary wherein power is derived from a variable source, the combination of, a constant speed motor having field windings and means to maintain substantially constant speed with variations in the voltage of the variable source, an alternator mechanically connected to be driven by said motor and having its output leads connected to supply alternating current power to the load, said alternator having a main field winding connected to receive substantially constant current from said output leads and having an auxiliary winding connected to carry current which varies with the load, said motor having a differential compensating motor winding, a current transformer connected with one of said output leads, and rectifier means connected to said current transformer and said compensating winding to supply a rectified current to said compensating winding from said current transformer whereby variations in the load current cause differential variations in the motor field.

JOHN J. KENNEDY.